(12) United States Patent
Kuo et al.

(10) Patent No.: US 11,074,587 B2
(45) Date of Patent: Jul. 27, 2021

(54) SYSTEMS AND METHODS FOR MITIGATING FRAUDULENT TRANSACTIONS

(71) Applicant: Capital One Services, LLC, McLean, VA (US)

(72) Inventors: Kenneth Kuo, New York, NY (US); Jeremy J. Phillips, Brooklyn, NY (US); Sonu Chopra-Khullar, McLean, VA (US); Maxime Moise, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/889,119

(22) Filed: Jun. 1, 2020

(65) Prior Publication Data

US 2021/0012347 A1    Jan. 14, 2021

Related U.S. Application Data

(63) Continuation of application No. 16/506,070, filed on Jul. 9, 2019, now Pat. No. 10,706,423.

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC ................................................. G06Q 20/4016
See application file for complete search history.

(56) References Cited

U.S. PATENT DOCUMENTS

| | | | |
|---|---|---|---|
| 2011/0196791 A1* | 8/2011 | Dominguez | G06Q 20/40 705/44 |
| 2014/0279527 A1* | 9/2014 | Duke | G06Q 20/4016 705/44 |
| 2015/0170148 A1 | 6/2015 | Priebatsch | |
| 2015/0348042 A1* | 12/2015 | Jivraj | G06Q 20/322 705/44 |
| 2017/0076274 A1* | 3/2017 | Royyuru | G06Q 20/20 |
| 2018/0053114 A1* | 2/2018 | Adjaoute | G06N 3/02 |
| 2018/0204280 A1 | 7/2018 | Painter et al. | |
| 2019/0087446 A1* | 3/2019 | Sharma | G06Q 20/382 |

* cited by examiner

*Primary Examiner* — Scott C Anderson
(74) *Attorney, Agent, or Firm* — DLA Piper LLP US

(57) ABSTRACT

Disclosed are systems and methods for mitigation of fraudulent transactions. In some embodiments, a server is communicatively coupled to a user device, and is configured to receive a proposed transaction from a merchant device communicatively coupled to the server, apply a dynamic classification algorithm to the proposed transaction to determine if the proposed transactions appears to be fraudulent, generate a user verification request when the proposed transaction appears to be fraudulent, transmit the user verification request to a user computing device communicatively coupled to the server, receive an approval or a refusal of the proposed transaction based on the user verification request, and process the proposed transaction based on the received approval or refusal of the proposed transaction.

15 Claims, 6 Drawing Sheets

Receive, at the fraudulent activity module, a proposed transaction from a merchant device. 301

Determine if the proposed transaction appears to be fraudulent. 303

If the proposed transaction does not appear to be fraudulent, process the transaction at the payment processing module. 305

Provide an indication to the merchant device that the proposed transaction is approved. 307

FIG. 3

Receive a user verification request reflective of a proposed transaction. 501
Provide the user verification request to a user via a user interface of the user computing device. 503
Receive, from a user, an approval or refusal of the proposed transaction. 505
FIG. 5

SYSTEMS AND METHODS FOR MITIGATING FRAUDULENT TRANSACTIONS

CROSS-REFERENCE TO RELATED APPLICATIONS

This application is a continuation of U.S. application Ser. No. 16/506,070, filed Jul. 9, 2019, which is incorporated herein by reference in its entirety.

TECHNICAL FIELD

The present disclosure is generally directed towards systems and methods for mitigating fraudulent transactions using a machine learning based module.

BACKGROUND

Conventional systems for detecting fraudulent transactions are often utilized after a transaction has taken place. For example, an unauthorized charge for $500 may not be checked for fraudulent activity prior to the charge being approved and the transaction settled. After the transaction is completed it may be flagged by a system as fraudulent based on an unusual location, unusual amount, and/or unusual time of day. As a result of being flagged, a user's card may be disabled.

However, this results in the fraudulent transaction being completed (including an exchange of monetary funds) and the added problem of the user's card being disabled until they are able to get back in touch with the card service provider.

Further, sometimes conventional systems for detecting fraudulent transactions are overly sensitive, and may lead to false positives (i.e., a system detects fraud when there is no fraud), where a user's card is unnecessarily disabled, causing further problems for the user. However, conventional systems for detecting fraudulent transactions may not be capable of learning from the circumstances that led to the false positives. Accordingly, the same type of behavior may continue to trigger a false positive.

At other times, conventional systems for detecting fraudulent transactions are not sensitive enough, and fail to detect fraudulent activity, referred to as a false negative (i.e., a system does not detect fraud when there is fraud). In conventional systems, the fraudulent transaction may be completed, and a user, merchant, or payment processor may not be able to identify the fraudulent transaction until it is already completed, there is an exchange of monetary funds, and the user sees it on a transaction system.

SUMMARY

Accordingly, there is a need for improved systems and methods for mitigating fraudulent transactions. The systems and methods described herein may include systems capable of learning from the circumstances that led to false positives, include systems with increased sensitivity, and those that are able to stop a fraudulent transaction from completing.

Embodiments of the disclosure are directed towards improved systems and methods for mitigation of fraudulent transactions. In some embodiments, a fraudulent activity module may utilize a machine learning based dynamic classification algorithm that is applied to incoming proposed transactions and configured to determine whether the incoming proposed transaction appears to be fraudulent. In the event that the incoming transaction appears to be fraudulent, the systems and methods may be configured to approach and receive feedback from the user affiliated with the account. The user may then approve or refuse the transaction. Accordingly, fraudulent events (such as purchases with a stolen credit card) may be stopped prior to a transaction being completed and processed by a payment processing system.

Advantageously, because the fraudulent activity module utilizes a machine learning based dynamic classification algorithm, in some embodiments, the algorithm may be updated using data from user feedback, including customer and merchant data. Additionally, the fraudulent activity module may be updated or trained based on data received from applications on a user computing device. This may assist in increasing the accuracy, and sensitivity of the fraudulent activity module. Further, in some embodiments, data from one customer may be combined with data across all customers to more accurately detect fraudulent activity. Additionally, in some embodiments, the disclosed system may be able to minimize the amount of false positives detected by the fraudulent activity module by creating lists of whitelisted items and/or whitelisted vendors.

The system may include a server communicatively coupled to a user device by a network, and the server may include a non-transitory memory storing computer-readable instructions and a processor. Execution of the computer-readable instructions may cause the server to receive a proposed transaction from a merchant device communicatively coupled to the server, apply a dynamic classification algorithm to the proposed transaction to determine if the proposed transactions appears to be fraudulent, generate a user verification request when the proposed transaction appears to be fraudulent, transmit the user verification request to a user computing device communicatively coupled to the server, receive an approval or a refusal of the proposed transaction based on the user verification request, and process the proposed transaction based on the received approval or refusal of the proposed transaction.

Embodiments of the system may also include a payment processing module configured to process the proposed transaction when it is determined that the proposed transaction does not appear to be fraudulent. Additionally, the dynamic classification algorithm may include at least one of a supervised learning algorithm and a decision tree. Further, the dynamic classification algorithm may be trained on at least one of customer data, population data, whitelisted items, and whitelisted vendors. In some embodiments, the server may be configured to update at least one of customer data, population data, whitelisted items, and whitelisted vendors stored on a database communicatively coupled to the server, responsive to receiving an approval or refusal of the proposed transaction based on the user verification request. The server may also be configured to update one or more parameters of the dynamic classification algorithm responsive to receiving an approval or refusal of the proposed transaction based on the user verification request. A portion of the customer data may be received via an application on the user computing device.

Methods of the present disclosure include an improved method for mitigating fraudulent transactions. In some embodiments, the method includes receiving a proposed transaction at a server from a merchant device communicatively coupled to the server, applying a dynamic classification algorithm to the proposed transaction to determine if the proposed transaction appears to be fraudulent, generating a user verification request when the proposed transaction appears to be fraudulent, transmitting the user verification request to a user computing device communicatively coupled to the server, receiving an approval or a refusal of the proposed transaction based on the user verification request, and processing the proposed transaction based on the received approval or refusal of the proposed transaction.

Further, the method may include processing the proposed transaction when it is determined that the proposed transaction does not appear to be fraudulent. Additionally, the dynamic classification algorithm may include at least one of a supervised learning algorithm and a decision tree. The method may include training the dynamic classification algorithm on at least one of customer data, population data, whitelisted items, and whitelisted vendors. Optionally, the method may include updating at least one of customer data, population data, whitelisted items, and whitelisted vendors stored on a database communicatively coupled to the server, responsive to receiving an approval or refusal of the proposed transaction based on the user verification request. The method may also include updating one or more parameters of the dynamic classification algorithm responsive to receiving an approval or refusal of the proposed transaction based on the user verification request. In some embodiments, a portion of the customer data is received via an application on the user computing device.

In another embodiment, a method of the present disclosure includes receiving a user verification request on a user computing device, wherein the user verification request is based on a determination by a dynamic classification algorithm that a proposed transaction appears to be fraudulent, displaying the user verification request on a user interface of the user computing device, receiving, from a user via the user interface, an approval or refusal for the proposed transaction based on the displayed user verification request, and transmitting the approval or refusal for the proposed transaction to a server system, where receipt of the approval or refusal triggers processing of the proposed transaction on the server system.

In such a method, the user interface includes at least one of a webpage and an application. The method may also include the step of accessing at least one of a calendar, camera, and social media application on the user computing device to generate customer data, vendor data and item data. The method may also include updating a dynamic classification algorithm on a server system communicatively coupled to the user computing device based on generated customer data, generated vendor data and generated item data. The method may further include updating at least one of customer data, population data, whitelisted items and whitelisted vendors stored on a database communicatively coupled to the user computing device. The method may also include the sub-steps of obtaining a picture of a receipt, processing the picture to determine at least one of a merchant address, merchant identification number, item identification number, stock keeping unit (SKU), item amount, total cost, and transaction time and generating customer data, vendor data and item data based on the processed picture, when accessing at least one of a calendar, camera, and social media application on the user computing device to generate customer data, vendor data and item data.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 3 illustrates a method for mitigating fraudulent transactions in accordance with some embodiments of the present disclosure.

FIG. 5 illustrates a method for mitigating fraudulent transactions in accordance with some embodiments of the present disclosure.

DETAILED DESCRIPTION

The disclosed systems and methods may include an improved system for mitigating fraudulent transactions. In some embodiments, the disclosed systems and methods may include a module configured to apply a dynamic classification algorithm that is capable of learning from past user behavior, past population behavior, and the like. Accordingly, the systems and methods described herein may include systems capable of learning from the circumstances that led to false positives. Further, the disclosed systems and methods may be able to stop a fraudulent transaction from completing.

Embodiments of the disclosure are directed towards improved systems and methods for mitigation of fraudulent transactions. In some embodiments, a fraudulent activity module may utilize a machine learning based dynamic classification algorithm that is applied to incoming proposed transactions and configured to determine whether the incoming proposed transaction appears to be fraudulent. In the event that the incoming transaction appears to be fraudulent, the systems and methods may be configured to approach and receive feedback from the user affiliated with the account. The user may then approve or refuse the transaction. Accordingly, fraudulent events (such as purchases with a stolen credit card) may be stopped prior to a transaction being completed and processed by a payment processing system.

Advantageously, because the fraudulent activity module utilizes a machine learning based dynamic classification algorithm, in some embodiments, the algorithm may be updated using data from user feedback, including customer and merchant data. Additionally, the fraudulent activity module may be updated or trained based on data received from applications on a user computing device. This may assist in increasing the accuracy, and sensitivity of the fraudulent activity module. Further, in some embodiments, data from one customer may be combined with data across all customers to more accurately detect fraudulent activity. Additionally, in some embodiments, the disclosed system may be able to minimize the amount of false positives detected by the fraudulent activity module by creating lists of whitelisted items and/or whitelisted vendors. Further, in some embodiments, the disclosed system may also be able to minimize the amount of false positives detected by the fraudulent activity module by creating a list of blacklisted items and/or blacklisted vendors.

Figure 1:
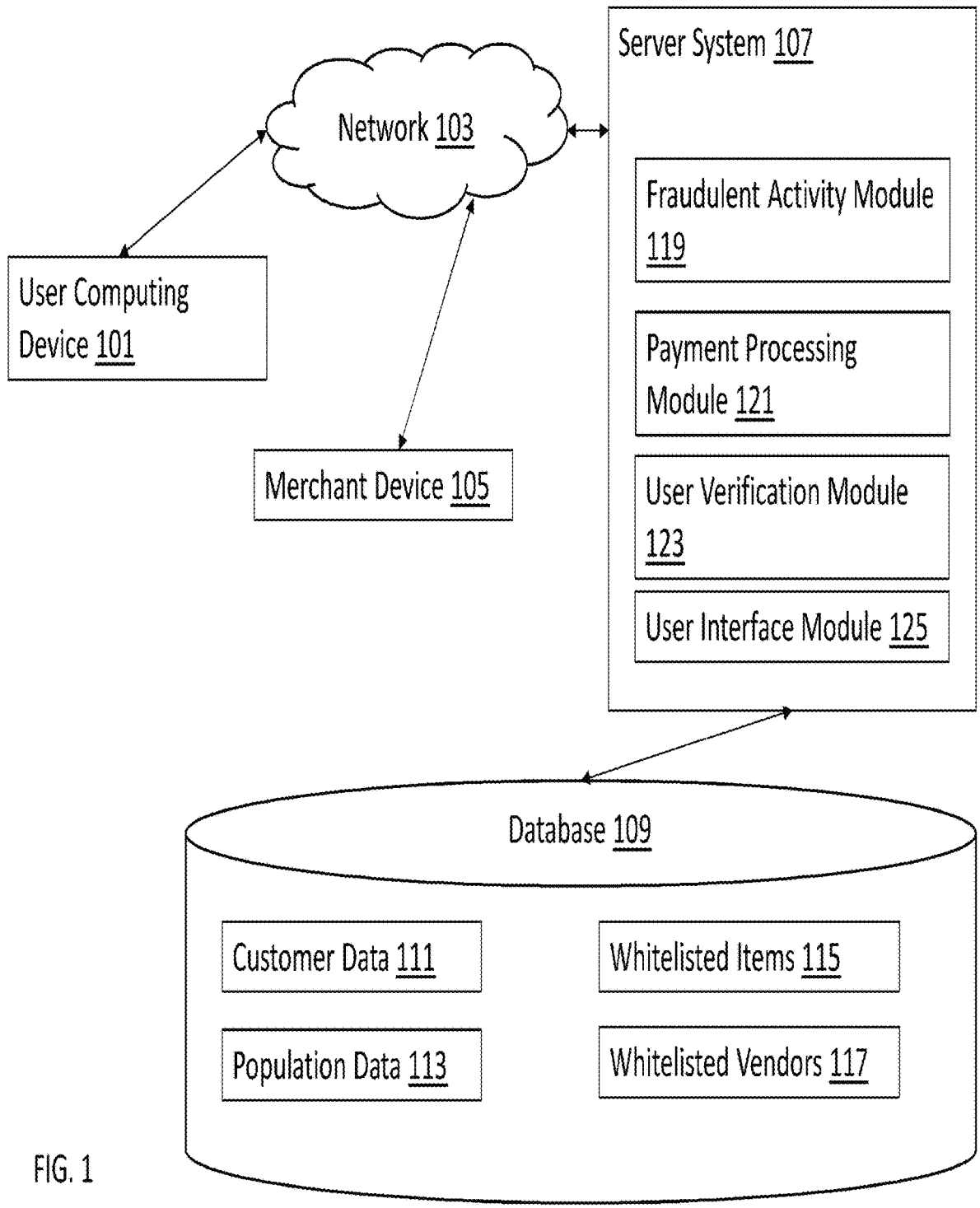
FIG. 1 illustrates an improved system for mitigation fraudulent transactions in accordance with some embodiments of the present disclosure.

FIG. 1 illustrates an improved system for mitigating fraudulent transactions in accordance with some embodiments of the present disclosure. As illustrated in FIG. 1, a user computing device 101 and a merchant device 105 may be communicatively coupled to a server system 107 by way of a network 103. The server system 107 may also be coupled to a database 109.

The user computing device 101 may include a desktop, a laptop, a tablet, a smartphone, cell phone, and the like. In some embodiments the user computing device 101 may be a mobile device such as a smart phone configured to run one or more software applications. The user computing device 101 may include a user interface. In some embodiments, the user computing device 101 may include an application (e.g., mobile banking wallet) configured to communicate with a payment processing system and/or financial card service (VISA®, Mastercard®). In some embodiments, the user computing device 101 may include an application configured to communicate with an issuing bank (e.g., Capital One®).

In some embodiments the merchant device 105, may include any computing device capable of initiating a payment by a financial card. The merchant device 105 may include a point of sale terminal (POS terminal). In some embodiments, the merchant device 105 may be stationary (e.g., kiosk) or mobile (e.g., card-reader attached to a tablet or smartphone). The merchant device 105 may be referred to as a credit card terminal, electronic fund transfer point of sale (EFTPOS) terminal and/or a process data quickly (PDQ) terminal. Merchant device 105 may be configured to allow a user to insert, swipe, or manually enter financial card information. Alternatively, or additionally, the merchant device 105 may be configured to receive near field communication (NFC) contactless transactions. The merchant device 105 may be configured to generate a proposed transaction based on an entity initiating a transaction using a financial card. For example, a user or a thief may elect to use a credit card to purchase items at a convenience store. The proposed transaction may include parameters such as the amount of the transaction, the date of the transaction, the time of the transaction, the location of the transaction, merchant identifying information and/or financial card identifying information.

The parameters of the proposed transaction may also include device data (corresponding to the user computing device 101 and/or the merchant device 105) as well as transaction history associated with a particular user computing device 101 and/or financial card. For example, in some embodiments, at least one of the financial card and/or the user computing device 101 may be associated with a particular user account and data and information related to the particular user account may be conveyed from the merchant device 105 to the server system 107. The merchant device 105 may be capable of and configured to retrieve data regarding the transaction and/or user from the financial card, and/or the user computing device 101. Example device data may include unique device identification information. Example device data may also include one or more parameters based on geo-location attributes (e.g., physical location value based on IP address), connection attributes (e.g., dedicated network connection, general Internet), timing and time zone attributes (e.g., number of connection attempts, time lapse between connection attempts, time in user time zone), network routing attributes (e.g., how the system's traffic is routed), application attributes (e.g., security protocols such as Secure Sockets Layer (SSL), or Transport Layer Security (TLS)), operating system attributes (e.g., operating system, browser), transaction behavior attributes (e.g., type of transaction, frequency of the type of transaction), and the like.

In some embodiments, financial card identifying information may be transmitted by the merchant device 105 to the server system 107 along with the proposed transaction. In such an embodiment, the financial card identifying information may be verified against the parameters of the proposed transaction by the fraudulent activity module 119 (discussed further below).

Network 103 may include a DSL (e.g., Digital Subscriber Line) connection, a PSTN (Public Switched Telephone Network) connection, an Ethernet connection, a broadband connection, a satellite connection and/or various other types of wired and/or wireless network communication protocols including microwave, radio frequency, infrared, Bluetooth, and near field communication.

Network 103 may be implemented as a single network or a combination of multiple networks. For example, in various embodiments, network 103 may include the Internet or one or more intranets, landline networks, wireless networks, and/or other appropriate types of networks. Thus, network 103 may correspond to small scale communication networks, such as a private or local area network, or a larger scale network, such as a wide area network or the Internet, accessible by the various components of system illustrated in FIG. 1.

The server system 107 may include one or more servers. The server system 107 may include a fraudulent activity module 119 configured to determine or predict whether a received proposed transaction is a fraudulent transaction. In some embodiments, this may include applying a machine learning based classification algorithm to a received proposed transaction. In some embodiments, the machine learning based classification algorithm may include a supervised learning algorithm. In some embodiments, the machine learning based classification algorithm may include a decision tree. In some embodiments, the fraudulent activity module 119 may apply cluster analysis and/or unsupervised learning algorithms. In some embodiments, a graph model may be used to determine relational links between a particular customer and known fraudulent activities. A graph model may be constructed based on data such as IP addresses, names, addresses, and/or country of origin. In some embodiments, the dynamic classification algorithm may be trained and/or updated based on at least one of customer data, population data, whitelisted items, whitelisted vendors, blacklisted items, and/or blacklisted vendors. In some embodiments, the fraudulent activity module 119 may apply filters related to whitelisted items, whitelisted vendors, blacklisted items, blacklisted vendors, and the like, before or after the machine learning based classification algorithm is applied to the received proposed transaction.

The server system 107 may also include a payment processing module 121 configured to process the proposed transaction when it is determined that the proposed transaction does not appear to be fraudulent. In some embodiments, processing a proposed transaction may be configured to facilitate authorization, authentication and settlement/clearing of a proposed transaction. In some embodiments, the payment processing module 121 may interface with acquiring banks, financial card networks (e.g., VISA®, Mastercard®), and issuing banks.

Further, the server system 107 may also include a user verification module 123 configured to generate a user verification request when the proposed transaction appears to be fraudulent according to the dynamic classification algorithm applied by the fraudulent activity module 119. The user verification request may include a description of the proposed transaction received by the server system 107. The user verification request may be transmitted to a user interface on a user computing device 101 for approval or refusal of the proposed transaction. In some embodiments, the user verification request is transmitted to the user interface on a user computing device 101 for approval or refusal prior to the proposed transaction being approved or refused. Accordingly, in comparison to conventional systems, in some embodiments of the disclosed systems and methods fraudulent transactions may be prevented before the transactions are finalized or completed.

Additionally, the server system 107 may also include a user interface module 125 configured to update a user interface module on the user computing device 101.

As discussed herein, the term "module" may refer to a component including hardware and/or software components. In some embodiments, "module" may be specially configured to perform the operations described herein. Although a single "module" may be referred to, in some embodiments, a module may comprise a plurality of components and vice versa.

As illustrated in FIG. 1, the server system 107 may be coupled to a database 109. The database 109 may include one or more data storage components configured to store customer data 111, population data 113, whitelisted items 115, and/or whitelisted vendors 117. Customer data 111 may include customer banking information including home address, email address, phone, work address, salary, balance, age, gender, and the like. Further, customer data 111 may include a record of previous merchants and/or purchases made by the customer. In some embodiments, the customer data 111 may include a historical record of past transaction locations, transaction amounts, transaction times, and/or individual items associated with a transaction.

Population data 113 may include customer data compiled over a population of users. For example, population data 113 may include data reflecting the spending habits of people in a particular demographic (e.g., 20-30 year old women living in an urban environment). Population data 113 may include data pertaining to relationships between items purchased, merchants, and transaction amounts.

In some embodiments, whitelisted items 115 may include items that the user typically buys. Often whitelisted items 115 may reflect items that the user may buy from various merchants. The presence of a whitelisted item 115 in a proposed transaction may be indicative of a non-fraudulent transaction.

In some embodiments whitelisted vendors 117 may include the merchants that the user buys typically buys from, vendors a payment processing company has pre-screened or identified, and vendors that are typical of a financial card user's profile. The presence of a whitelisted vendor 117 in a proposed transaction may be indicative of a non-fraudulent transaction. Examples of whitelisted vendors 117 may include utilities such as cable providers, gas companies, electric companies and the like. For each of the whitelisted vendors 117 the customer specific transaction history may include information for typical transaction amounts. In this manner, an amount associated with a proposed transaction may be compared against a customer typical transaction for a whitelisted vendor and subsequently approved (i.e., the proposed transaction is does not appear to be fraudulent).

In some embodiments, the database 109 may also include blacklisted vendors and/or blacklisted items. For example, the list of blacklisted vendors may include vendors that are associated with fraudulent transactions. In some embodiments, this may be linked to an IP address or other device identifying information that is associated with fraud. In some embodiments, blacklisted items may include items that are commonly purchased for fraud.

In some embodiments, the whitelisted items 115 and/or whitelisted vendors 117 may be provided by a user of the system. For example, over time the server system may recognize a plurality of vendors that the user has purchased items from (including those for proposed transactions not thought to be fraudulent and those for proposed transactions the user provided approvals for). These vendors may form the whitelisted vendors 117. Additionally, if a user indicates that a particular vendor is whitelisted, that vendor may be whitelisted for other users as well. In some embodiments, the system may be configured such that the user may actively whitelist vendors and transactions in real-time.

In some embodiments, the whitelisted items 115 and/or the whitelisted vendors 117 may receive information from one or more applications on the user computing device via the user interface module 125. For example, information from a calendar application may be used to whitelist purchases made at particular vendors at particular times (e.g., a calendar invite for Lunch at Restaurant X may whitelist purchases made at Restaurant X). Similarly, a bill pay application or email application that receives a bill from a shop or store may whitelist a transaction for the particular amount and vendor.

In other embodiments, whitelisted items 115 may be generated by a user providing a photograph obtained by their computing device. For example, a user may take a photograph of a receipt, and the system may be configured to apply optical character recognition or other techniques to determine vendor and item information. The determined vendor and/or item information may then be used to update or add to a list of whitelisted items 115 or whitelisted vendors 117.

In some embodiments, whitelisted items 115 and/or whitelisted vendors 117 may be stored in a ranked listing. In some embodiments, the ranking may be determined by a machine learning based algorithm. In some embodiments, the fraudulent activity module may determine a score reflective of the likelihood that a particular proposed transaction is fraudulent. In such an event, the determined score may be compared against a threshold score, in order to determine if the proposed transaction appears fraudulent or non-fraudulent. The threshold score may be set according to user preferences specified via a user interface (e.g., mobile application) on the user computing device. For example, user preferences may specify whether the user wants high, medium, or low sensitivity for fraud detection.

In some embodiments the whitelist(s) and/or blacklist(s) may be associated with a fraud application interface that is configured to receive and distribute data and information to and from external sources such as a financial services provider, a banking services provider, and the like. In this manner, vendors or items with known associations to fraudulent activity may be provided to the server system 107 and/or database 109. Further data and information provided to the server system 107 and/or database 109 or learned by the server system 107 (via the machine learning based classification algorithm of the fraudulent activity module 119) may be provided to external sources.

Figure 2:
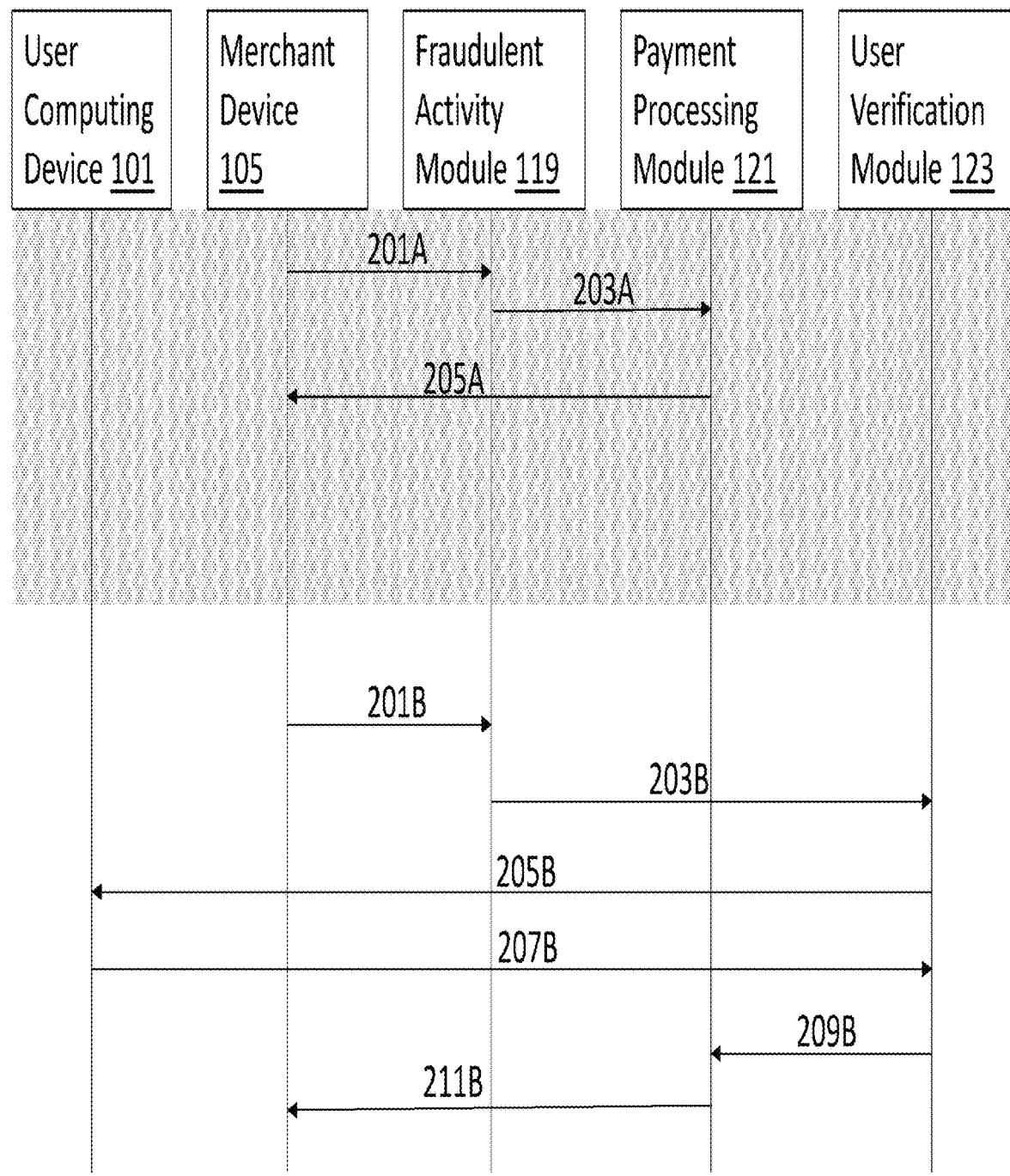
FIG. 2 illustrates interactions between components of the improved system for mitigation of fraudulent transactions in accordance with some embodiments of the present disclosure.

FIG. 2 illustrates interactions between components of the improved system for mitigation of fraudulent transactions in accordance with some embodiments of the present disclosure. In particular, FIG. 2 illustrates the interactions between the user computing device 105, merchant device 105, and the fraudulent activity module 119, payment processing module 121, and user verification module 123 of the server system 107.

In particular, steps 201A, 203A, and 205A illustrate the interactions between components of the improved system in accordance with a first scenario (e.g., proposed transaction does not appear to be fraudulent). As illustrated in FIG. 2, a merchant device 105 may receive a financial card (e.g., debit card, credit card) for payment for a transaction. Proposed transaction data may be generated by the merchant device 105 and may include the date of the transaction, time of the transaction, vendor of the transaction, items for transaction, transaction amount, and the like. The merchant device 105 may then transmit the proposed transaction data to the server system 107 in step 201A.

Upon receiving the proposed transaction data, a fraudulent activity module 119 may apply a dynamic classification algorithm to the proposed transaction to determine if the proposed transaction appears to be fraudulent. In some embodiments, the dynamic classification algorithm may be "dynamic" in that the parameters of the dynamic classification algorithm may be adjusted according to prior classifications made by the fraudulent activity module 119 as well as historical user and population data. In some embodiments, the dynamic classification algorithm may be configured to classify the proposed transaction into one of a transaction that appears fraudulent, and a transaction that does not appear fraudulent.

In some embodiments, the dynamic classification algorithm may be trained on at least one of customer data, population data, whitelisted items, whitelisted vendors, blacklisted items, blacklisted vendors, and the like.

In some embodiments, the dynamic classification algorithm may be trained on data specific to a particular user. For example, each account associated with the financial card provided to the merchant device may also be associated with a server system. Accordingly, as the fraudulent activity module 119 trains and learns on the account and user specific data, the described system may detect fraud in specialized and individualized ways.

In some embodiments, the dynamic classification algorithm may be updated after a proposed transaction was initially determined to appear fraudulent and subsequently indicated as approved by the user.

Further, in addition to applying a dynamic classification algorithm, the fraudulent activity module 119 may verify the transaction against whitelisted items and/or vendors. Additionally, in some embodiments, the fraudulent activity module 119 may verify the transaction against blacklisted items and/or blacklisted vendors.

In the event that the fraudulent activity module 119 determines that the proposed transaction does not appear to be fraudulent, the proposed transaction may be transmitted to the payment processing module 121 for further processing (as illustrated in step 203A). Processing the proposed transaction may include authorization, authentication and settlement/clearing of the proposed transaction. In some embodiments, the payment processing module 121 may interface with acquiring banks, financial card networks (e.g., VISA®, Mastercard®), and issuing banks (not shown). After receiving authentication of the proposed transaction from a financial card network, the payment processing module 121 may transmit an approval or confirmation of the proposed transaction to the merchant device 105 as illustrated in step 205A.

Steps 201B, 203B, 205B, 207B, 209B, and 211B illustrate interactions between components of the improved system in accordance with a second scenario (e.g., proposed transaction appears to be fraudulent).

Similar to the process illustrated in connection with step 201A, a merchant device 105 may receive a financial card (e.g., debit card, credit card) for payment for a transaction. Proposed transaction data may be generated by the merchant device 105 and may include the date of the transaction, time of the transaction, vendor of the transaction, items for transaction, transaction amount, and the like. The merchant device 105 may then transmit the proposed transaction data to the server system 107 in step 201B.

At the fraudulent activity module 119, the proposed transaction the fraudulent activity module 119 may apply a dynamic classification algorithm and determine that the proposed transaction appears to be fraudulent.

When a determination is made that the proposed transaction appears fraudulent, the fraudulent transaction module 119 may be configured to provide the proposed transaction to the user verification module 123, as illustrated in step 203B.

The user verification module 123 may be configured to receive the proposed transaction and generate a user verification request. A user verification request may include a description of the proposed transaction received by the server system 107. For example, the user verification request may include the proposed transaction amount, the vendor associated with the proposed transaction amount, and the location.

The user verification module 123 may transmit the user verification request to the user computing device 101 as illustrated in step 205B. In connection with the user interface module 125 the user verification request may be used to generate and/or update a user interface on the user computing device 101. Accordingly, the user verification request may be displayed on the user computing device 101. A user of the user computing device 101 may then provide approval or refusal of the proposed transaction. In some embodiments, the user computing device 101 to which the user verification request is transmitted may be associated with a particular financial card. For example, a user may have downloaded a mobile application onto their device (e.g., smartphone) and preconfigured the mobile application to be linked to a particular financial card.

For example, a mobile application on a smartphone may be configured to display the user verification request. Additionally, the mobile application may be configured to receive a refusal or approval of the proposed transaction corresponding to the user verification request. Accordingly, a user of the described systems and methods, may be able to approve or refuse a proposed transaction prior to the transaction being completed.

In another example, a user verification module 123 may be configured to send a text message or phone call to the user computing device 101 including the user verification request and a user may be configured to approve or refuse the proposed transaction via the text message, or phone call (e.g., voice response, entering a number on a touchpad).

In some embodiments, the user verification request may be accompanied by an authentication component. Accordingly, the user of the user computing device may have to verify their identity prior to being able to approve or refuse the proposed transaction.

In accordance with step 207B, approval or refusal of the proposed transaction may be transmitted from the user computing device 101 to the user verification module 123.

If a refusal is received, the refusal may be communicated to the payment processing module 121 at step 209B which then communicates the refusal to the merchant device at step 211B. Additionally, the payment processing module 121 may be configured to provide information regarding the refusal to a credit card processing company, issuing bank, and the like, as a refusal may be indicative of a fraudulent transaction.

If an approval is received, the approval may be communicated to the payment processing module 121 at step 209B which then communicates the approval to the merchant device 105 at step 211B. Additionally, the payment processing module 121 may be configured to process the approval in accordance with the credit card processing company and the like. The merchant device 105 may display approval of the proposed transaction.

FIG. 3 illustrates a method for mitigating fraudulent transactions in accordance with some embodiments of the present disclosure. In particular, FIG. 3 illustrates a process when a proposed transaction does not appear to be fraudulent. In a first step 301, a fraudulent activity module may receive a proposed transaction from a merchant device. In a second step 303, the fraudulent activity module may determine if the proposed transaction appears to be fraudulent. In the third step 305, if the proposed transaction does not appear to be fraudulent, the proposed transaction may be processed by the payment processing module. In a fourth step 307, an indication may be provided to the merchant device that the proposed transaction is approved.

Figure 4:
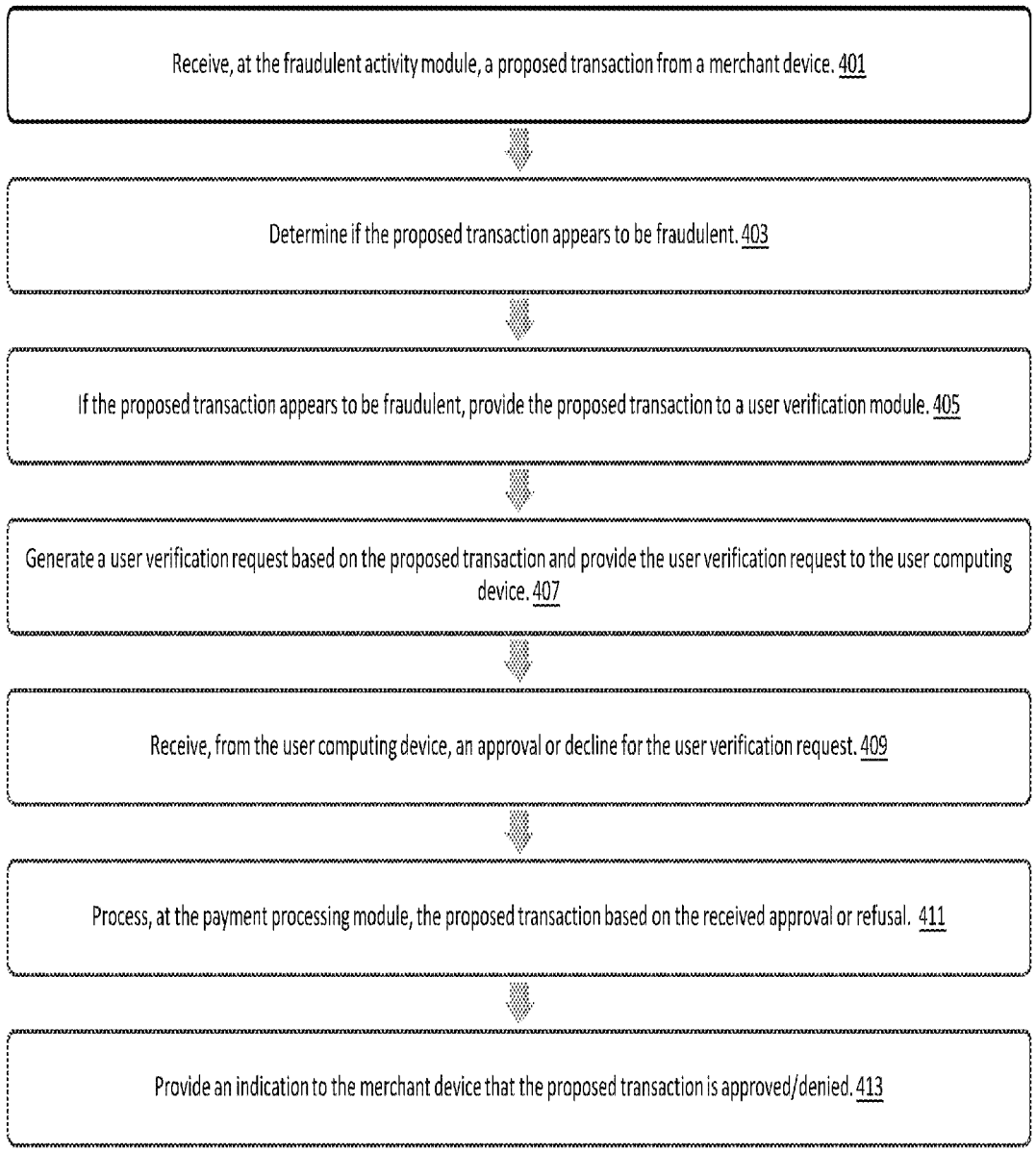
FIG. 4 illustrates a method for mitigating fraudulent transactions in accordance with some embodiments of the present disclosure.

FIG. 4 illustrates a method for mitigating fraudulent transactions in accordance with some embodiments of the present disclosure. In particular, FIG. 4 illustrates a process when a proposed transaction appears to be fraudulent. In a first step 401, a proposed transaction is received at the fraudulent activity module from a merchant device. At step 403, it is determined if the proposed transaction appears fraudulent. At step 405, if the proposed transaction appears to be fraudulent, it is provided to a user verification module 405. At step 407, a user verification request may be generated based on the proposed transaction. Further, the user verification request may be provided to the user computing device. At step 409, a server system may receive, from the user computing device, an approval or refusal for the user verification request. At step 411, the proposed transaction may be processed by the payment processing module based on the received approval or refusal. At step 413, an indication may be provided to the merchant device that the proposed transaction is approved or refused.

FIG. 5 illustrates a method for mitigating fraudulent transactions in accordance with some embodiments of the present disclosure. In particular, the process illustrated in FIG. 5 may be implemented on a user computing device. In a first step 501, the user computing device may receive a user verification request reflective of a proposed transaction. In a second step 503, the user computing device may provide the user verification request to a user via a user interface of the computing device. And in a third step 505, the user computing device may receive, from the user, an approval or refusal of the proposed transaction.

In some embodiments, the disclosed systems and methods may be integrated with a dashboard or website that is configured to receive customer data 111, population data 113, whitelisted items 115, whitelisted vendors 117, blacklisted vendors, and/or blacklisted items. For example, a user of the system that is associated with the financial card configured to be provided to the merchant device 105 may login to a website or portal and update account information. This account information may include a list of merchants, geographic region, merchant categories, or particular items that they would like to whitelist and/or blacklist. Alternatively, or additionally, the disclosed systems and methods may be integrated within an application configured for display on a mobile device such as a smartphone, tablet, laptop, or the like.

Figure 6:
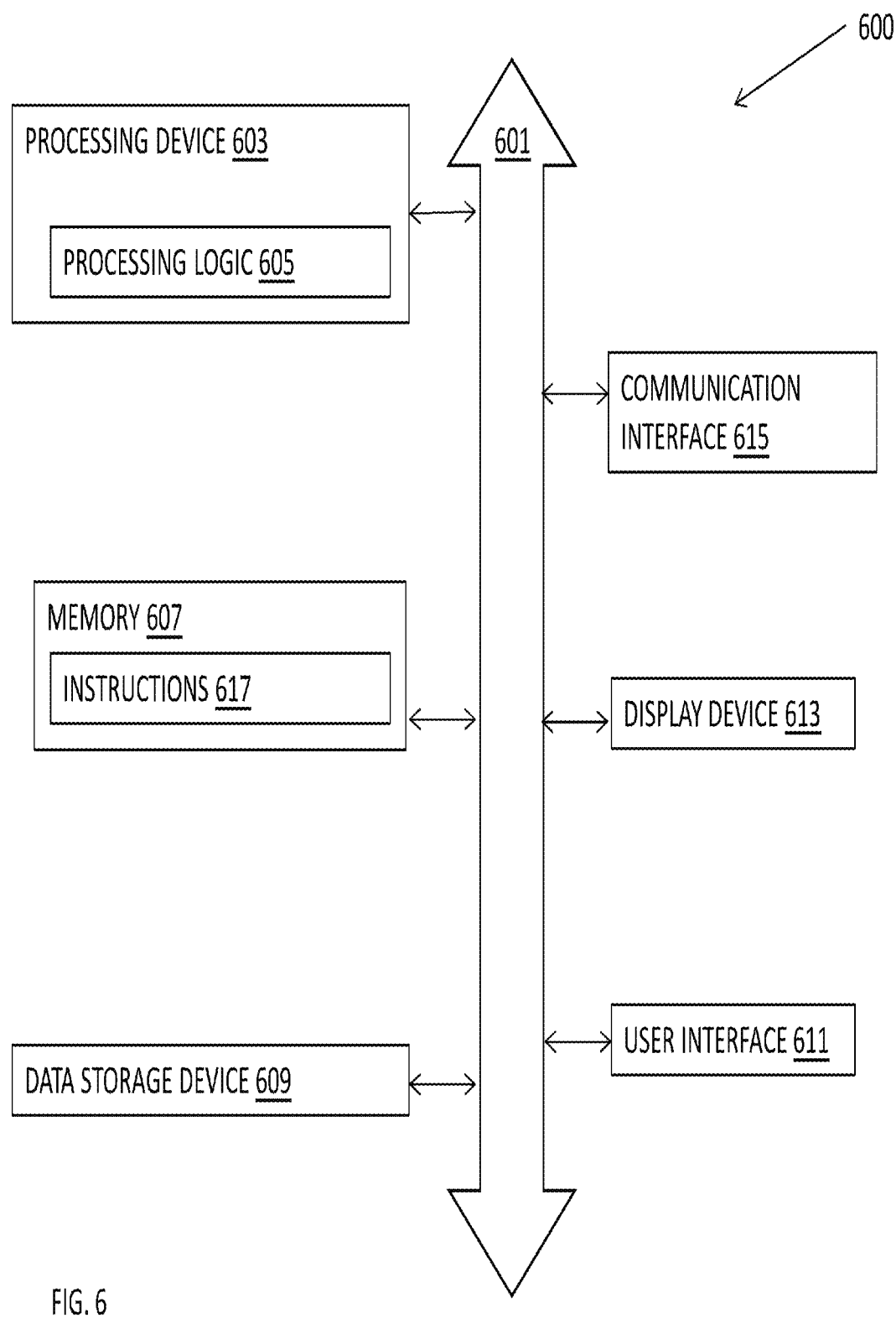
FIG. 6 illustrates a computing system for use in mitigating fraudulent transactions in accordance with some embodiments of the present disclosure.

FIG. 6 illustrates a computer system in accordance with some embodiments of the present disclosure. FIG. 6 illustrates a functional block diagram of a machine in the example form of computer system 600, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the user computing device 101, merchant device 105 and the server system 107 of FIG. 1 may be implemented by the example machine shown in FIG. 6 (or a combination of two or more of such machines).

Example computer system 600 may include processing device 603, memory 607, data storage device 609 and communication interface 615, which may communicate with each other via data and control bus 601. In some examples, computer system 600 may also include display device 613 and/or user interface 611.

Processing device 603 may include, without being limited to, a microprocessor, a central processing unit, an application specific integrated circuit (ASIC), a field programmable gate array (FPGA), a digital signal processor (DSP) and/or a network processor. Processing device 603 may be configured to execute processing logic 605 for performing the operations described herein. In general, processing device 603 may include any suitable special-purpose processing device specially programmed with processing logic 605 to perform the operations described herein.

Memory 607 may include, for example, without being limited to, at least one of a read-only memory (ROM), a random access memory (RAM), a flash memory, a dynamic RAM (DRAM) and a static RAM (SRAM), storing computer-readable instructions 617 executable by processing device 603. In general, memory 607 may include any suitable non-transitory computer readable storage medium storing computer-readable instructions 617 executable by processing device 603 for performing the operations described herein. Although one memory device 607 is illustrated in FIG. 6, in some examples, computer system 600 may include two or more memory devices (e.g., dynamic memory and static memory).

Computer system 600 may include communication interface device 611, for direct communication with other computers (including wired and/or wireless communication), and/or for communication with network 103 (see FIG. 1). In some examples, computer system 600 may include display device 613 (e.g., a liquid crystal display (LCD), a touch sensitive display, etc.). In some examples, computer system 600 may include user interface 611 (e.g., an alphanumeric input device, a cursor control device, etc.).

In some examples, computer system 600 may include data storage device 609 storing instructions (e.g., software) for performing any one or more of the functions described herein. Data storage device 609 may include any suitable non-transitory computer-readable storage medium, including, without being limited to, solid-state memories, optical media and magnetic media.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, soft ware, Software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components. The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. For example, much of this document has been described with respect to television advertisements, but other forms of future, viewership-based advertisements may also be addressed. Such as radio advertisements and on-line video advertisements. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The invention claimed is:

1. An improved system for mitigation of fraudulent transactions comprising:
 a server communicatively coupled to a user device by a network, wherein the server comprises a non-transitory memory storing computer-readable instructions and a processor, the execution of the computer-readable instructions causing the server to:
  receive a proposed transaction from a merchant device communicatively coupled to the server;
  apply a dynamic artificial intelligence classification algorithm to the proposed transaction to determine if the proposed transactions appears to be fraudulent, wherein the dynamic artificial intelligence classification algorithm is trained on at least one of whitelisted items and whitelisted vendors and at least one of customer data, or population data;
  generate a user verification request when the proposed transaction appears to be fraudulent;
  transmit the user verification request to a user computing device communicatively coupled to the server;
  receive an approval or a refusal of the proposed transaction based on the user verification request;
  process the proposed transaction based on the received approval or refusal of the proposed transaction;
  update the trained dynamic artificial intelligence classification algorithm responsive to receiving an approval or refusal of the proposed transaction based on the user verification request; and
  apply the updated dynamic artificial intelligence classification algorithm to a second proposed transaction to determine if the second proposed transaction appears to be fraudulent.

2. The system of claim 1, wherein the server comprises:
a payment processing module configured to process the proposed transaction when it is determined that the proposed transaction does not appear to be fraudulent.

3. The system of claim 1, wherein the dynamic artificial intelligence classification algorithm comprises at least one of a supervised learning algorithm and a decision tree.

4. The system of claim 1, wherein the dynamic artificial intelligence classification algorithm is updated based on at least one of customer data, population data, whitelisted items, or whitelisted vendors.

5. The system of claim 1, further comprising:
a database communicatively coupled to the server configured to store parameters of the dynamic artificial intelligence classification algorithm.

6. The system of claim 1, wherein a portion of the customer data is received via an application on the user computing device.

7. The system of claim 1, wherein applying the dynamic artificial intelligence classification algorithm to either the proposed transaction or the second proposed transaction to determine if the proposed transaction or the second proposed transaction appears to be fraudulent further comprises:
determining a score reflective of the likelihood that the proposed transaction or second proposed transaction is fraudulent; and
comparing the determined score to a threshold score.

8. The system of claim 7, wherein the threshold score_is set according to user preferences specified via a user interface.

9. An improved method for mitigation of fraudulent transactions
comprising:
receiving a proposed transaction at a server from a merchant device communicatively coupled to the server, the server communicatively coupled to the merchant device by a network, wherein the server comprises a non-transitory memory storing computer-readable instructions and a processor;
applying a dynamic artificial intelligence classification algorithm to the proposed transaction to determine if the proposed transaction appears to be fraudulent, wherein the dynamic artificial intelligence classification algorithm is trained on at least one of whitelisted items and whitelisted vendors and at least one of customer data, or population data;
generating a user verification request when the proposed transaction appears to be fraudulent;
transmitting the user verification request to a user computing device communicatively coupled to the server;
receiving an approval or a refusal of the proposed transaction based on the user verification request;
processing the proposed transaction based on the received approval or refusal of the proposed transaction;
updating dynamic artificial intelligence classification algorithm responsive to receiving an approval or refusal of the proposed transaction based on the user verification request; and
applying the updated dynamic artificial intelligence classification algorithm to a second proposed transaction to determine if the second proposed transaction appears to be fraudulent.

10. The method of claim 9, comprising:
processing the proposed transaction when it is determined that the proposed transaction does not appear to be fraudulent.

11. The method of claim 9, wherein the dynamic artificial intelligence classification algorithm comprises at least one of a supervised learning algorithm and a decision tree.

12. The method of claim 9, wherein the dynamic artificial intelligence classification algorithm is trained or updated based on at least one of customer data, population data, whitelisted items, or whitelisted vendors stored on a database communicatively coupled to the server, responsive to receiving an approval or refusal of the proposed transaction based on the user verification request.

13. The method of claim 9, wherein a portion of the customer data is received via an application on the user computing device.

14. The method of claim 9, wherein applying the dynamic artificial
intelligence classification algorithm to the proposed transaction further comprises:
determining a score reflective of the likelihood that the proposed transaction is fraudulent; and
comparing the determined score to a threshold score.

15. The method of claim 12, further comprising:
setting the threshold score according to user preferences specified via a user interface.

* * * * *